No. 757,769.

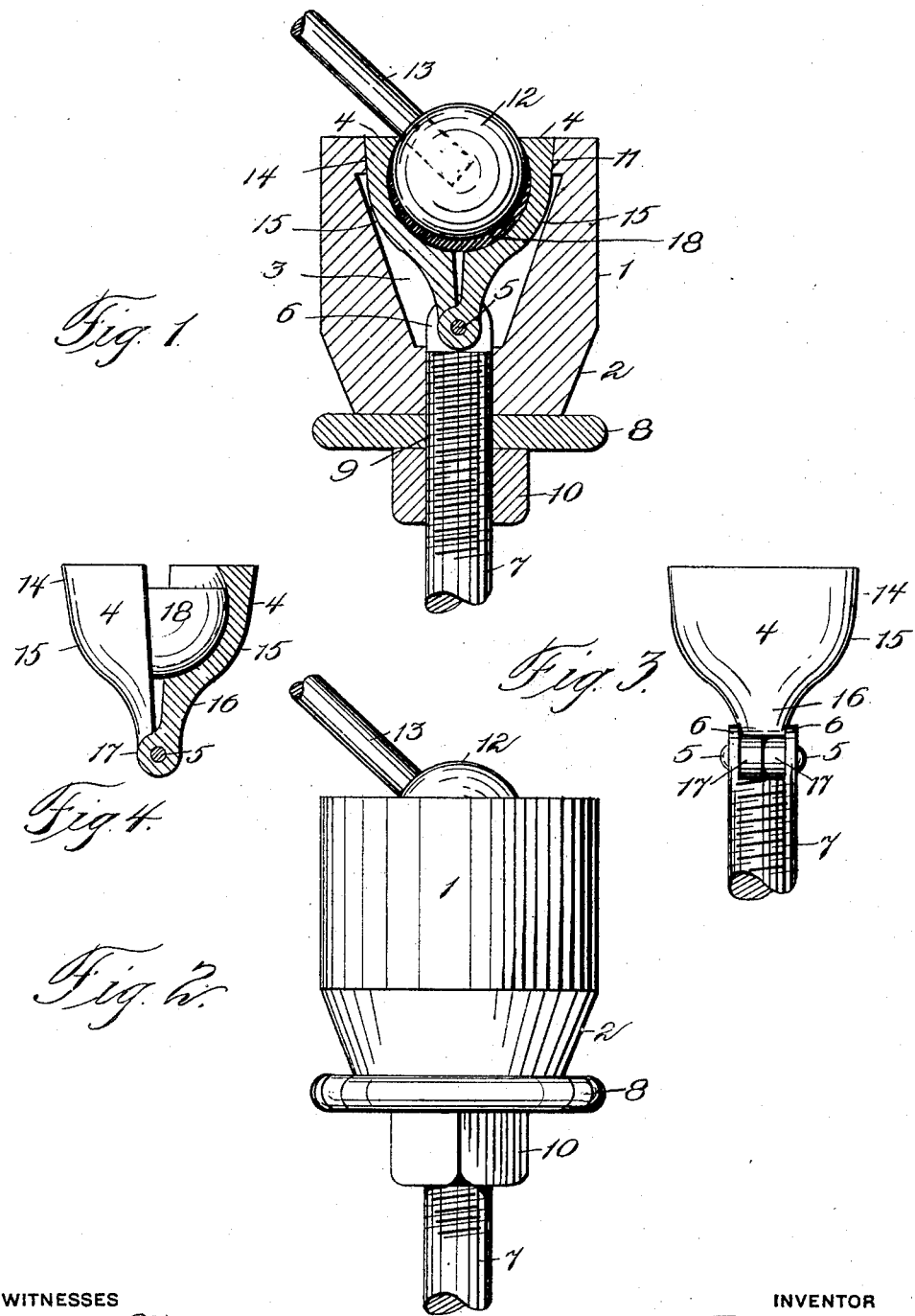

Patented April 19, 1904.

UNITED STATES PATENT OFFICE.

EARL JOSEPH REECE, OF WASHINGTON, DISTRICT OF COLUMBIA.

UNIVERSAL JOINT.

SPECIFICATION forming part of Letters Patent No. 757,769, dated April 19, 1904.

Application filed June 5, 1903. Serial No. 160,147. (No model.)

*To all whom it may concern:*

Be it known that I, EARL JOSEPH REECE, a citizen of the United States, residing at Washington, in the District of Columbia, have invented new and useful Improvements in Universal Joints, of which the following is a specification.

My invention relates to certain new and useful improvements in universal joints, of which the following is a full, clear, and exact description.

This invention has for its object to provide a joint which will be more especially applicable to cameras, drawing-tables, and similar articles wherein it is necessary to adjust the parts to various positions; but it will be understood that this joint may be used elsewhere where a universal adjustment is required.

Further, my invention has for its object to provide a universal joint which will be strong, rigid, and highly efficient in its purpose and comparatively cheap and easy to manufacture.

In the preferable embodiment of my invention reference will be had to the accompanying drawings, forming a part of this specification, and wherein like numerals of reference denote corresponding parts throughout the several views, in which—

Figure 1 is a vertical section. Fig. 2 is a front elevation, and Fig. 3 is an elevation of the clamping members. Fig. 4 is an elevation of the clamping members, showing one broken away in section to disclose the cup-shaped rubber washer.

Reference-numeral 1 indicates a body of substantially cylindrical shape, having its lower portion tapering, as at 2. This body is provided with a central tapering bore 3, within which are arranged the locking members, which comprise two yokes 4, pivoted at their lower ends by a pin 5 between ears 6, provided on the upper end of the stem 7. Said stem is screw-threaded and extends through the lower portion of the body, in which it is threaded. Arranged on the said stem and impinging the lower face of the body is a disk 8, having a central threaded bore 9, whereby the same is secured on the said stem, and also threaded on the stem and impinging the said disk 8 is a nut of ordinary construction. On the upper edge of the body is an inwardly-extending flange 11, having its inner face tapering.

The two locking members 4 have their inner faces shaped to form a seat to receive an elastic cup-shaped washer 18, preferably of rubber, within which is arranged a ball 12, to which is secured a rod or other suitable connecting means 13, preferably having its one end embedded therein. The outer faces of the locking members 4 are tapered to register with the corresponding face of the flange 11, and midway their lengths the said members 4 have a round bulging face 15, which when the said members are drawn downwardly, engages the tapering walls of the bore 3 of the said body, the resiliency of the washer acting to increase the friction between the ball and the yokes by forcing the former upward and also pressing the yokes against the body 1. The lower ends of said members are reduced, as at 16, and are provided with cylindrical portions 17, forming the hinge for the said members.

The operation of my device is as follows: The ball 12 is placed within the locking members while the same are forced from within the body 1 and are in a spread position by means of the stem 7 and resilient washer 18, after which the stem is drawn downwardly with relation to the body, thus causing the locking members to come together by reason of the tapering faces thereof engaging the tapering faces of the body. Thus the ball 12 is held from displacement, and a continuance of the downward movement of the locking members causes the bulging face 15 thereof to engage the walls of the tapering bore 3, thereby forcing the locking members closer together and rigidly securing the ball therebetween. The washer being compressed by the locking members coming together forces the ball up against the upper edges of the locking members to more rigidly secure the ball.

It will be observed that the farther the members are forced down into the body 1 the more securely the ball is gripped between the locking members, and when the desired adjustment is obtained the disk 8 and locking-nut 10 are screwed up against the body to prevent any displacement.

It will be understood that I do not limit myself to the exact details of arrangement and construction, but may make various changes wholly within the scope of my invention without departing from the spirit thereof.

Having thus fully described my invention, what I claim as new, and desire to secure by Letters Patent of the United States, is—

1. A universal joint consisting of a body having a tapering bore, a flange integral with said body and extending inwardly from the upper end thereof, a stem threaded in the lower end of said bore, locking members pivoted on said stem and adapted to operate in said bore and to have their outer faces engaged by the inner face of the flange so that when the said members are in a locking position the top portions of the said members will be in the same plane as the top portion of the flange, and a ball mounted in said locking members.

2. A universal joint consisting of a body having a tapering bore, a flange integral with said body and extending inwardly from the upper end thereof, a stem threaded in the lower end of said bore, locking members pivoted on said stem and adapted to operate in said tapering bore, a ball mounted in said locking members, and a washer disposed between the locking members and the ball, said washer surrounding more than the lower half of the said ball.

In testimony whereof I have signed my name to this specification in the presence of two subscribing witnesses.

EARL JOSEPH REECE.

Witnesses:
    FRED C. JONES,
    IDA J. FORD.